United States Patent [19]

Bass

[11] Patent Number: 4,821,445
[45] Date of Patent: Apr. 18, 1989

[54] WATER DELIVERY SYSTEM AND METHOD

[76] Inventor: Robert E. Bass, P.O. Box 93, Vivian, La. 71082

[21] Appl. No.: 946,791

[22] Filed: Dec. 29, 1986

[51] Int. Cl.⁴ .............................................. A01K 69/00
[52] U.S. Cl. ........................................ 43/4.5; 43/6.5; 43/55
[58] Field of Search ............... 43/6.5, 4.5, 26.1, 57, 43/55; 114/314

[56] References Cited

U.S. PATENT DOCUMENTS

| | | | |
|---|---|---|---|
| 1,447,553 | 3/1923 | Hudson | 43/6.5 |
| 2,163,282 | 6/1939 | Hovden | 43/6.5 |
| 3,421,245 | 1/1969 | Reich | 43/6.5 |
| 3,583,365 | 6/1971 | Harden | 43/6.5 |
| 3,871,332 | 3/1975 | Hayashi | 43/6.5 |
| 3,940,867 | 3/1976 | Sikich | 43/6.5 |
| 4,103,447 | 8/1978 | Hill | 43/4.5 |
| 4,347,680 | 9/1982 | Kaestner | 43/4.5 |
| 4,551,398 | 11/1985 | Sheldon et al. | 43/6.5 |
| 4,558,990 | 12/1985 | Roach | 43/6.5 |

FOREIGN PATENT DOCUMENTS 8202645  8/1982  Denmark ............... 43/6.5

*Primary Examiner*—Nicholas P. Godici
*Assistant Examiner*—Karen Skillman
*Attorney, Agent, or Firm*—John M. Harrison

[57] ABSTRACT

A water delivery system for delivering water of optimum ph, oxygen content and/or temperature from a water body into a holding tank or live well for containing fish or other marine life, which system includes a water pick-up cone attached to a hose which is carried by a reel, wherein the pick-up cone is lowered to an ideal water depth or stratum and water is pumped to the holding tank or live well. In a first preferred embodiment of the invention, a submersible pump is provided in the pick-up cone for pumping the water into the holding tank or live well and in a second preferred embodiment, a pump is located at the dry end of the water transfer hose to achieve the pumping function. A method for delivering water of optimum ph, oxygen content and/or temperature from a comfort zone or stratum in a water body to a holding tank or to one or more live wells in a boat, which method includes the steps of lowering a water pick-up cone to the estimated comfort zone or stratum for fish at a desired depth; monitoring the ph, oxygen content and/or temperature of the water at this depth; pumping water from this stratum into the holding tank or live well(s); and monitoring the ph, oxygen content and/or temperature of the water in the holding tank or live well(s) to maintain a water condition in the holding tank or live well(s) which closely approximates the water condition at the selected stratum depth in the water body from which the water is pumped.

26 Claims, 3 Drawing Sheets

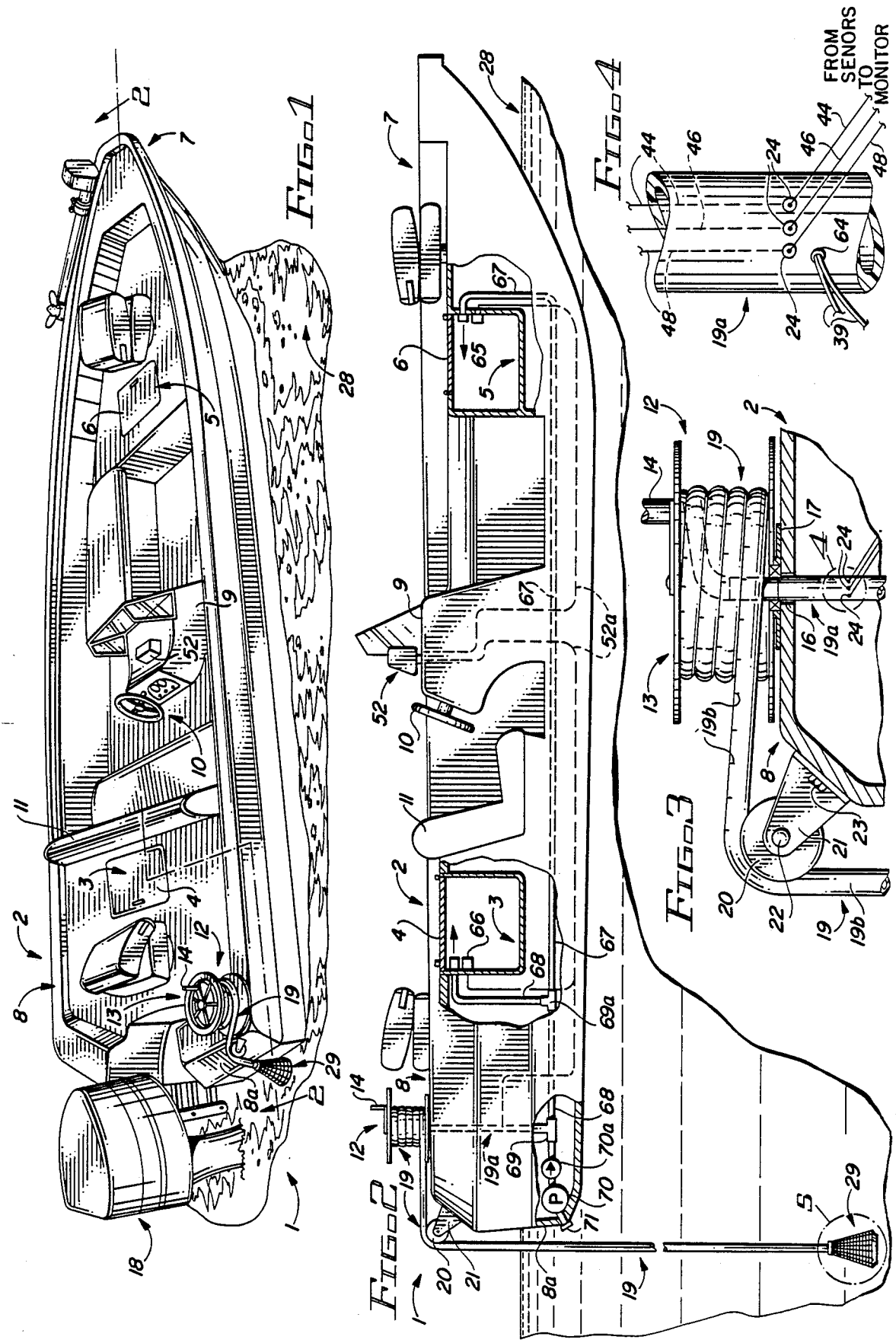

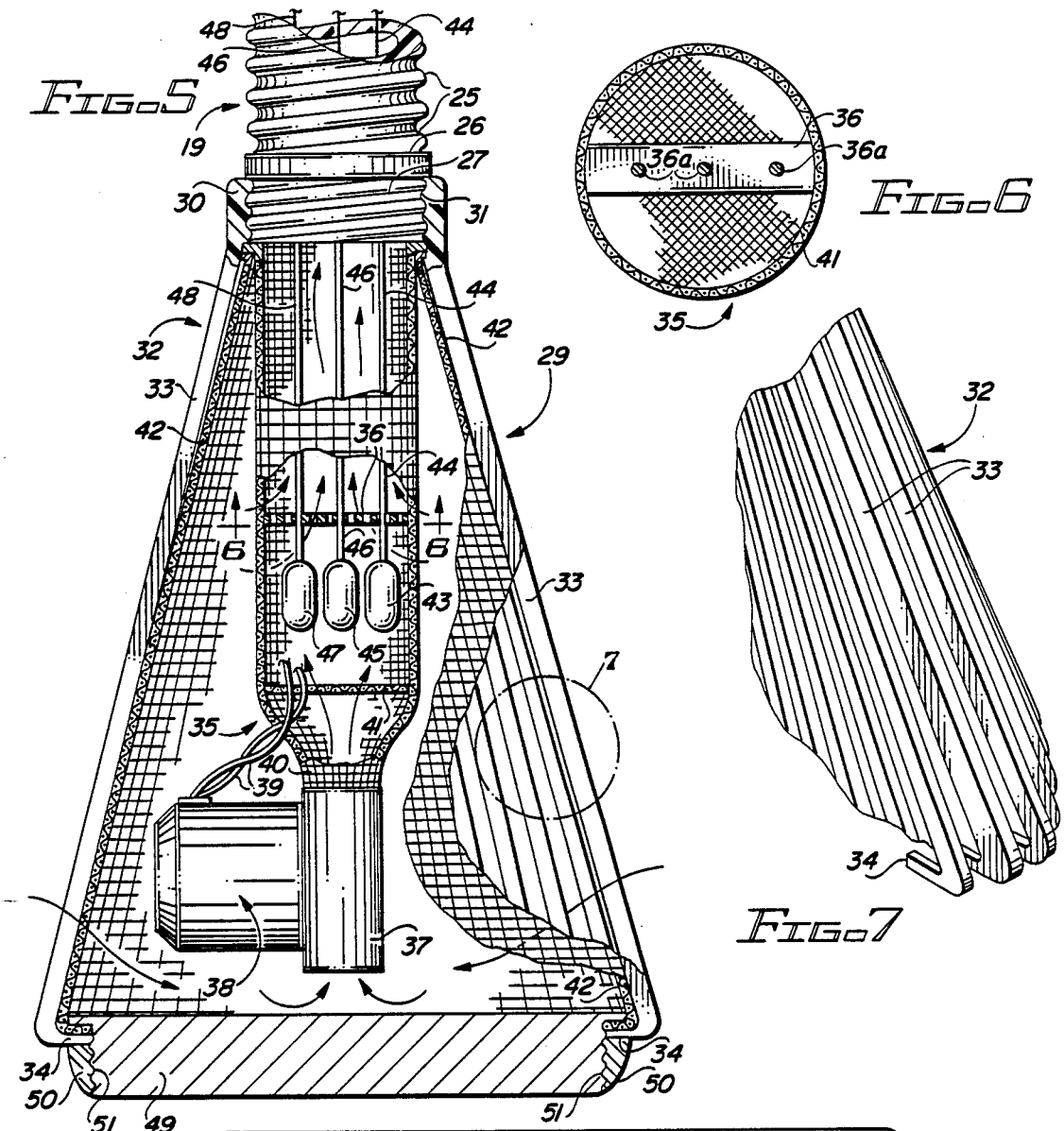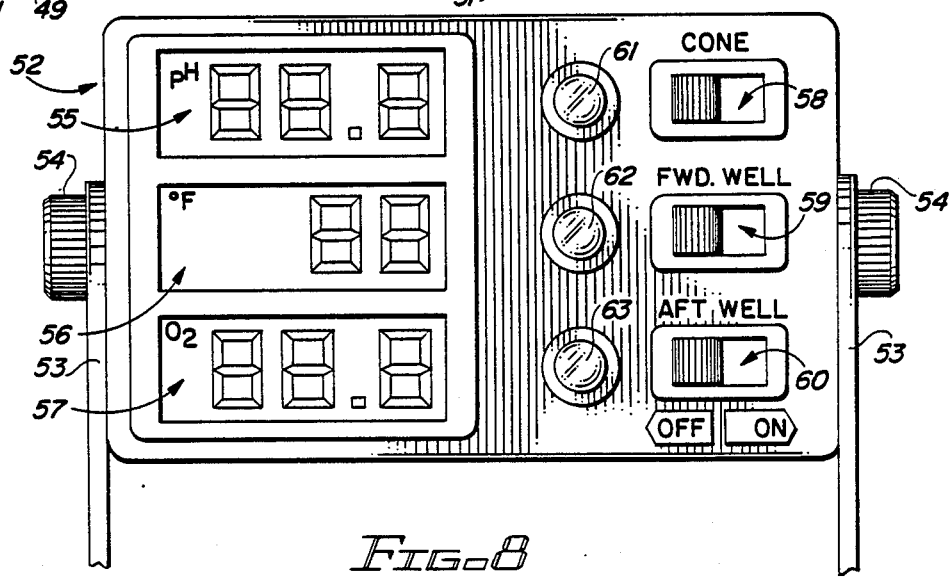

WATER DELIVERY SYSTEM AND METHOD

BACKGROUND OF THE INVENTION

1. Field of the Invention

One of the problems associated with sport fishing is keeping fish alive during long fishing intervals, and early efforts to this effect included stringing the fish on chain and cord stringers which were hung over the side of the boat. Since the fish are exposed to hot, oxygen-depleted surface water under these circumstances, they soon die. Furthermore, the fish tend to become entangled in weeds, moss and other underwater obstacles when placed on such stringers. Later attempts to prolong the life of fish included the installation of one or more live wells in boats, some of which live wells include water circulation pumps and external pumps for pumping surface water from the lake directly into the live well or wells. While ice is sometimes added to the live wells to cool the water, the cooling effect does little to alleviate the problem since this water is oxygen-depleted and unfit to sustain life, having been pumped from the surface of the lake or water body. Since the suction intake for conventional live wells is attached to the boat, it is located just below the water surface and only surface water is therefore available for pumping into the live wells. A similar problem exists in the maintaining of minnows, small bait fish and other bait such as shrimp in a live condition during both salt water and fresh water expeditions.

In recent years it has become apparent that fish of various species will migrate to certain depths in a water body where the conditions of ph, oxygen content and/or temperature are optimum. These stratum or "comfort zones" may change throughout the day and night due to temperature and sunlight variation and are not the same for every species of fish. For example, lake trout generally prefer a colder lake stratum than black bass. This comfort zone is typically located by fishing lures which are retrieved at known depths or by using an electronic fish locator.

This invention relates to the maintaining of fish and marine life in a live condition in holding tanks, bait containers and in one or more live wells in a boat. More particularly, the invention relates to a method and apparatus for transferring water having an optimum ph, oxygen content and/or temperature for sustaining the life of fish and other marine life such as shrimp, from a comfort zone stratum in a water body containing the fish or shrimp to a holding tank or to one or more live wells in a boat, for keeping the fish and shrimp or other marine life alive. The apparatus includes a water pick-up cone attached to the end of a flexible hose, which hose is mounted on a reel carried by a dock, floating structure or a boat, by raising and lowering the cone to determine an optimum depth where water of comfortable life-sustaining qualities for fish is located. The opposite end of the hose is routed to a holding tank or to one or more or live wells in a boat and in a preferred embodiment of the invention, a submersible pump is located in the water pick-up cone for transferring water of optimum ph, oxygen content and/or temperature into the holding tank or live wells. In a second preferred embodiment, the pump is located on the dock, floating structure or in the boat and operates to pump water from the selected water stratum through the pick-up cone and hose into the holding tank or live wells. In a most preferred embodiment of the invention the system is mounted on a boat and the pump which is located in the boat is provided in addition to the conventional live well pump which pumps surface water from the lake or other water body directly into the live wells of the boat in conventional fashion. In another most preferred embodiment of the invention, sensors for determining the ph, oxygen content and/or temperature conditions of the water are located in the pick-up cone and are connected by sensor wires to a monitor located on the steering console or elsewhere at a convenient point in the boat, in order to provide instant indication of the respective water conditions monitored at the desired depth. Additional sensors may also be installed in the holding tank, live well or live wells, in order to determine whether the ph, oxygen and/or temperature conditions in the holding tank or live well(s) are the same as those in the lake or water body being fished at the estimated comfort depth stratum for fish. The method of this invention includes the steps of determining the approximate depth in the water body where the fish are located; lowering the pick-up cone to that zone or stratum by operation of the reel which carries the pick-up hose; determining the ph, oxygen content and/or temperature of the water in that comfort zone by operation of the monitor; pumping water from the selected comfort zone through the pick-up cone and hose into the live well or live wells; and periodically monitoring the water in the live well(s) to determine whether the ph, oxygen content and/or temperature is compatible with that of the water at the comfort zone depth.

2. Description of the Prior Art

Various techniques for fishing and transferring fish from one environment to another are known in the art. An early technique for catching and loading fish is disclosed is U.S. Pat. No. 1,447,553, dated Mar. 6, 1923, to M. R. Hudson. The "Trawl" disclosed in this patent is operated beneath the surface of the water in conventional fashion, but includes a hose attached to the collection end of the trawl for receiving the fish and pumping fish from the trawl to the boat without retrieving the trawl. A "Means for Catching Fish" is disclosed in U.S. Pat. No. 2,163,282, dated June 20, 1939, to K. Hovden. The Hovden patent discloses an underwater vacuum tube which is designed to suck fish through an expanded collection end to the boat. U.S. Pat. No. 3,421,245, dated Jan. 14, 1969, to D. W. Lerch, discloses a "Fish Pump System With Combined Articulated Support Boom and Conduit". The fish pump system detailed in this patent is characterized by an articulated boom for locating a fish pick-up nozzle in the water when the boat is pitching and rolling in high seas, in order to continuously pump fish from a net located in the water and enclosing the fish, into the hold of the ship. A "Method And Apparatus For Handling Fish" is disclosed in U.S. Pat. No. 3,583,365, dated June 8, 1971, to Darrel G. Harden. This patent discloses a method and apparatus for transferring live fish from one body of water to a retaining container and then to a second body of water. The method includes flowing a stream of water containing entrained fish under a pressure differential into a retaining container, where the fish are strained out and the water stream is continually removed. The fish are subsequently released from the retaining container by reversing the flow of water into and out of the retaining container. U.S. Pat. No. 3,940,867, dated Mar. 2, 1976, to Matthew J. Sikich, discloses a "Guidance Valve For Fish Pumps". The patent details an intake guidance valve for connection to an intake opening of a fish pump having a frusto-conical shield open at its small end and at its base. A conical deflector is mounted on the shield and a plurality of vanes extend at an end beyond the base of the shield and at at their other ends towards, but short of, the apex of the deflector, to provide multiple, upward-tapering guidance passages. An annular flange projects radially from the base of the deflector, such that the water and fish are drawn radially into the guidance passages.

It is noted that the prior art patents delineated above each detail an apparatus and method for collecting and pumping fish from a water body to a fishing vessel or holding tank. The transfer of water by the pumping apparatus in each of these patented systems is incidental to the desired transfer of fish.

It is an object of this invention to provide a new and improved method and apparatus for transferring water from a selected depth and stratum of optimum comfort to fish or other marine life to a holding tank, bait container or at least one live well of a boat.

Another object of this invention is to provide a new and improved method and apparatus for transferring water from a selected comfort zone in a water body to a holding tank or the live well or live wells of a boat, which water is characterized by a selected ph, oxygen content and/or temperature for sustaining the life of fish or other marine life taken from the water body or elsewhere and placed in the holding tank or live well(s).

Yet another object of this invention is to provide a new and improved reel and water pick-up apparatus for transferring water from a selected depth and stratum of a water body to the live well or live wells of a boat, which apparatus is characterized by a water pick-up cone mounted on one end of a flexible hose which is wound on a reel attached to the boat, wherein the pick-up cone is lowered to a selected water depth and stratum of optimum comfort to fish, and water from this comfort zone is pumped through the hose to the live wells, in order to sustain the life of fish placed in the live wells.

Yet another object of the invention is to provide a new and improved reel and water pick-up apparatus for mounting on a dock, floating platform or a boat and pumping water from a selected depth and comfort zone or stratum where fish are located, into a holding tank, bait container or the portable or built-in live well or live wells of a boat, which apparatus is characterized by a water pick-up cone mounted on one end of a flexible hose or tube, with either a submersible pump provided in the pick-up cone or a non-submersible pump located on the dock, platform or in the boat, and the hose or tube suspended from a reel mounted on the dock, platform or boat, wherein water is pumped from the selected depth into the holding tank, bait container or the live well or live wells, to sustain the life of fish taken from the water body at the selected depth and placed in the holding tank, bait container or live wells.

A still further object of the invention is to provide a method and apparatus for pumping water having a selected ph, oxygen content and/ or temperature from a selected depth or comfort zone for fish to the live well or live wells of a boat, which apparatus includes a water pick-up cone provided with a submersible pump and fitted with ph, oxygen and/or temperature sensors and a hose carrying the pick-up cone, which hose is wound on a reel attached to the boat, wherein the reel can be operated according to the method of this invention to raise and lower the pick-up cone to the optimum water depth, in order to pump water at this depth through the hose into the live well or live wells and sustain the life of fish placed in the live well or live wells.

Yet another object of this invention is to provide a new and improved method and apparatus for pumping water from an optimum depth or comfort zone for fish in the water body, to the live well or live wells of a boat, which apparatus includes a pick-up cone having ph, oxygen and/or temperature sensors therein for determining the ph, oxygen content and/or temperature of the water at this selected depth; a hose carrying the pick-up cone and wound on a reel attached to the boat; and a pump provided in the boat and located in association with the hose, for pumping water at the selected depth into the live well or live wells for sustaining the life of fish in the live well(s).

A still further object of this invention is to provide a method for providing water of optimum ph, oxygen content and/or temperature from a selected depth in a water body to the live well or live wells of a boat for sustaining the life of fish, which method includes the steps of lowering a water pick-up cone to a selected depth and comfort zone or stratum wherein the ph, oxygen content and/or temperature of the water is at an optimum level for the attraction of fish; pumping water from this stratum into the live well or live wells; monitoring the ph, oxygen content and/or temperature of the water at the selected stratum in the live wells; and periodically comparing the condition of the water in the live wells to the condition of the water at the selected depth in the water body.

SUMMARY OF THE INVENTION

A method and apparatus for maintaining water in a holding tank or in one or more live wells in a boat at an optimum ph, oxygen content and/or temperature to sustain the life of fish, by the steps of lowering a water pick-up cone into a water body to a desired comfort zone or depth where fish are located, which depth is characterized by a water content of optimum ph, oxygen and/or temperature; pumping water from this stratum into the holding tank or live well(s); monitoring the ph, oxygen content and/or temperature of the water at the selected depth and in the holding tank or live well(s); and periodically comparing water conditions in the holding tank or live well(s) to the water conditions at the optimum depth in the water body, to maintain fish placed in the holding tank or live well(s) in a live condition. In a preferred embodiment of the invention the water pick-up cone is attached to a flexible hose and the hose is wound on a reel attached to the boat for raising and lowering the pick-up cone.

BRIEF DESCRIPTION OF THE DRAWINGS

The invention will be better understood by reference to the accompanying drawings, wherein:

FIG. 1 is a perspective view of a boat provided with a first preferred embodiment of the water delivery system of this invention;

FIG. 2 is a sectional view taken along line 2—2 of the boat in FIG. 1;

FIG. 3 is an enlarged view of a preferred reel for winding and unwinding the flexible water hose in the water delivery system;

FIG. 4 is a section of the flexible hose illustrated in FIGS. 1-3, showing a preferred routing of sensor wires from the hose to the monitor;

FIG. 5 is a sectional view of a first preferred water pick-up cone which is equipped with a submersible pump for pumping water through the hose into the live wells of a boat;

FIG. 6 is a sectional view taken along line 6—6 in FIG. 5, of a spacer for maintaining the ph, oxygen and temperature sensors into sensing position inside the water pick-up cone;

FIG. 7 is an enlarged view of a preferred deflector skirt which shields the outside of the water pick-up cone to minimize entanglement of the water pick-up cone with underwater obstacles;

FIG. 8 is a front elevation of a preferred monitor for monitoring the ph, oxygen content and/or temperature of the water at a selected depth in a water body and the water in the live wells of the boat;

DESCRIPTION OF THE PREFERRED EMBODIMENTS

Figure 9:
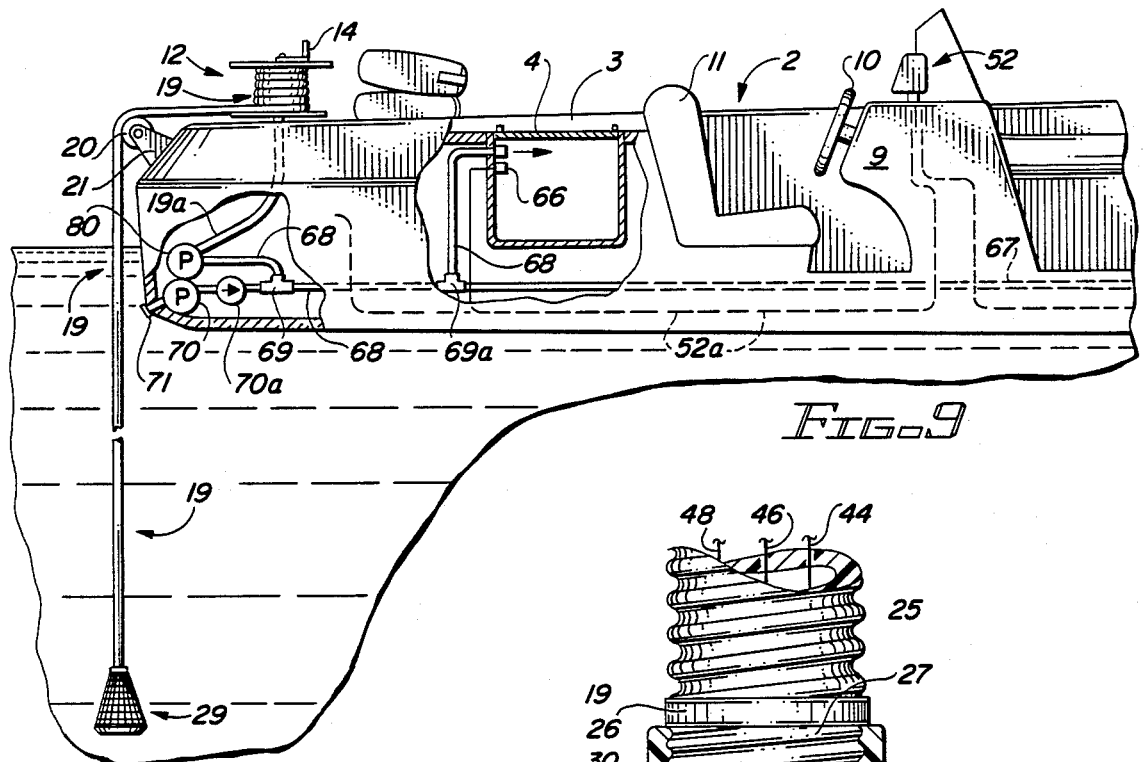
FIG. 9 is a partial sectional view of the boat illustrated in FIG. 1, illustrating a second preferred embodiment of the invention, wherein the submersible pump is replaced by a pump mounted in the boat.

Referring initially to FIGS. 1 and 2 of the drawings the water delivery system of this invention is generally illustrated by reference numeral 1. The water delivery system 1 is mounted on a boat 2 which is rigged for game fishing and includes a rear live well 3, closed by a rear live well lid 4, and a front live well 5, provided with a front live well lid 6, as illustrated. The rear live well 3 and the front live well 5 are both designed to receive game or bait fish and are constructed to be filled with water, in order to maintain the game or bait fish in a live condition, as hereinafter described. The boat 2 is characterized by a contoured bow 7 and a stern 8 which accommodates an outboard motor 18, mounted on the transom 8a. A steering console 9 is provided intermediate the bow 7 and the stern 8 and is fitted with a steering wheel 10. A driver's seat 11 is provided for operating the steering wheel 10 when a driver is seated behind the steering console 9, as illustrated.

Referring now to FIGS. 2 and 3, the water delivery system 1 of this invention is further characterized by a reel 12, having a reel frame 13, which is mounted on the stern 8 of the boat 2 by means of a mount bracket 17 and receives a length of water supply hose 19, provided with depth graduations 19b, and terminated at one end by a pick-up cone 29. The opposite end of the water supply hose 19 is attached to a hose sleeve 15, mounted in the reel frame 13 of the reel 12 by means of a bearing 16, to facilitate rotation of the reel frame 13 and the water supply hose 19 with respect to the hose sleeve 15, as illustrated in FIG. 3. A handle 14 is attached to the reel frame 13 for winding and unwinding the water supply hose 19, in order to raise and lower the pick-up cone 29 into and out of the water body 28, which floats the boat 2. Alternatively, the reel 12 can be automated and power-driven according to the knowledge of those skilled in the art. As further illustrated in FIGS. 2 and 3 of the drawings, in another preferred embodiment of the invention the water system hose 19 is supported by a pulley 20, which is rotatably secured to a pulley bracket 21 by means of a pulley pin 22. The pulley bracket 21 is bolted to the stern 8 of the boat 2, by means of mount bolts 23 and serves to facilitate raising and lowering the pick-up cone 29 into and from the water body 28, pursuant to operation of the reel 12. In yet another preferred embodiment of the invention, the reel 12 is a smaller counterpart of the swing reel number 400D manufactured by SMC of St. Paul, Minn., which is commonly used to selectively deploy a garden hose which is wound on the reel frame while connected to a water supply. Accordingly, referring again to FIG. 3, when the mount bracket 17 is secured to the stern 8 of the boat 2, one end of the water supply hose 19 is attached to the hose sleeve 15, while an interior hose segment 19a is secured to the opposite end of the hose sleeve 15, such that water can be pumped through the water supply hose 19 and the hose sleeve 15 and into the interior hose segment 19a, without leaking at the sealed bearing 16. As further illustrated in FIG. 2, in a first preferred embodiment of the invention the interior hose segment 19a is connected to the tee leg of a pump tee fitting 69 and a rear live well pipe 68 projects from one of the tee runs of the tee fitting 69 to one of the tee runs and the tee leg of a distribution tee fitting 69a, into the rear live well 3. The opposite tee run of the tee fitting 69 extends to a check valve 70a and a conventional live well pump 70, which is connected to a live well pump intake 71 extending through the transom 8a of the stern 8. A front live well pipe 67 projects from the second tee run of the distribution tee fitting 69a, into the front live well 5.

Referring now to FIGS. 2 and 5-7 of the drawings in the first preferred embodiment of the invention, the pick-up cone 29 is characterized by a cone neck 30 which is fitted with neck threads 31, for threadibly receiving the collar threads 27 of a hose collar 26, secured to one end of the water supply hose 19. The water supply hose 19 is most preferably constructed with multiple hose corregations 25, in order to facilitate bending of the water supply hose 19 around the pulley 20 as the water supply hose 19 is wound on the reel frame 13 of the reel 12. A deflector skirt 32, having multiple, resilient, spaced skirt fingers 33 as illustrated in FIG. 7, projects downwardly from the cone neck 30 and terminates in inwardly extending fingertips 34, as illustrated. A cone screen 42 also projects downwardly from the cone neck 30 and follows the inside contour of the outer deflector skirt 32, to terminate in an inwardly extending cone screen rim 42a. A weight bracket 50 is secured to the cone screen rim 42a and is provided with bracket threads 51 for threadibly receiving a lead weight 49, in order to facilitate rapid sinking of the pick-up cone 29 responsive to unwinding of the water supply hose 19 from the reel 12, as illustrated in FIG. 2. A hose screen 35 projects downwardly from the cone neck 30 and tapers at the extending end to define a hose screen nozzle 40, which is attached to a pump mount tube 37. A submersible pump 38 is attached to the pump mount tube 37, for pumping water inwardly between the skirt fingers 33 of the deflector skirt 32 and through the cone screen 42, hose screen 35 and the water supply hose 19, as hereinafter described. A discharge screen 41 is deployed in transverse relationship across the hose screen 35, in order to structurally support the hose screen 35 and a spacer 36, provided with spacer openings 36a, serves to receive and stabilize the ph sensor wire 44, temperature sensor wire 46 and oxygen sensor wire 48 and prevent the ph sensor 43, temperature sensor 45 and oxygen sensor 47 from colliding with each other inside the hose screen 35, when the pick-up cone 29 is raised and lowered by operation of the reel 12. In another preferred embodiment of the invention, the pump motor wiring 39 extends from the submersible pump 38 through the hose screen 35, discharge screen 41 and the spacer 36 and then through the water supply hose 19, to a battery and switch (not illustrated), in order to selectively energize the submersible pump 38.

Referring now to FIGS. 2, 4 and 8 of the drawings, in another preferred embodiment of the invention the interior hose segment 19a is provided with three sealed sensor wire openings 24 and a sealed motor wiring opening 64, which facilitate exiting of the ph sensor wire 44, the temperature sensor wire 46 and the oxygen sensor wire 48, as well as the pump motor wiring 39, from the interior of the interior hose segment 19a. The sensor wire 44, temperature sensor wire 46 and the oxygen sensor wire 48 are then routed through a wiring harness 52a, illustrated in phantom in FIG. 2, to a monitor 52, which is mounted on the steering console 9 of the boat 2. As heretofore described, the pump motor wiring 39 extends from the interior hose segment 19a to a switch and battery combination (not illustrated). As further illustrated in FIG. 8 of the drawings, the monitor 52 is secured to a monitor bracket 53 by means of bracket knobs 54 and the monitor bracket 53 is in turn mounted to the console 9, by techniques well known to those skilled in the art. The monitor 52 is characterized by a ph display 55, a temperature display 56 and an oxygen display 57, provided in association with a pick-up cone light 61, a front live well light 62 and a rear live well light 63. A pick-up cone switch 58, front live switch 59 and rear live well switch 60 complete the visual and switch components of the electronic monitor 52. Since the pick-up cone 29 is equipped with a ph sensor 43, temperature sensor 45 and oxygen sensor 47, ph, temperature and oxygen content readings can be obtained at any depth to which the pick-up cone is lowered by manipulating the pick-up cone switch 58 on the monitor 52 to the "on" position. Furthermore, referring again to FIG. 2 of the drawings, in a most preferred embodiment of the invention, a front live well sensor group 65 is mounted in the front live well 5 and a rear live well sensor group 66 is mounted in the rear live well 3, both of which front live well sensor group 65 and rear live well sensor group 66 are electrically attached to the monitor 52 by means of the wiring harness 52a. Accordingly, when the front live well switch 59 and rear live well switch 60 are manipulated to the "on" position, the front live well light 62 and the rear live well light 63 are illuminated and the ph, temperature and oxygen content readings in the front live well 5 and rear live well 3 are displayed in the ph display 55, temperature display 56 and the oxygen display 57, respectively.

Figure 10:
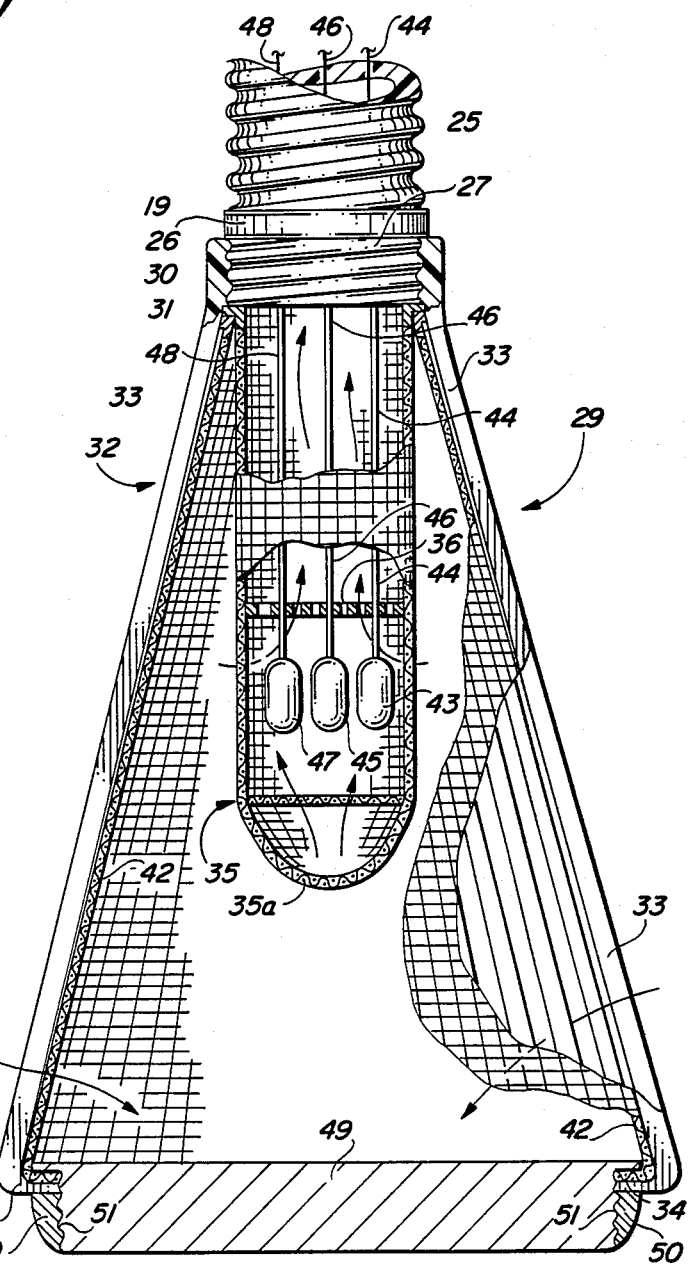
FIG. 10 is a sectional view of a second preferred water pick-up cone for use in the water delivery system illustrated in FIG. 9.

Referring now to FIGS. 9 and 10 of the drawings, in another most preferred embodiment of the invention, the pick-up cone 29 is characterized by a hose screen 35 which is terminated at the hose screen end 35a and is not fitted with a submersible pump 38 and pump mount tube 37. As illustrated in FIG. 9, a booster pump 80 is located inside the stern 8 of the boat 2 and receives one end of the interior hose segment 19a, for pumping water from a selected depth through the pick-up cone 29, water supply hose 19, hose sleeve 15 and into the rear live well pipe 68, rear live well 3 and the front live well pipe 67 and front live well 5.

In operation, and referring again to FIGS. 2, 3, 5 and 8 of the drawings, in a first preferred embodiment of the invention the water delivery system 1 is utilized in cooperation with the boat 2 by initially locating the fish at a specified comfort zone or stratum depth, using a fish locator or estimating this depth by catching fish on certain types of lures. When this optimum depth is either estimated or determined, the reel 12 is operated by grasping the handle 14 and unwinding a length of the water supply hose 19 to deploy the pick-up cone 29 at the selected depth, by reference to the depth graduations 19, as illustrated in FIGS. 2 and 3. The monitor 52 is then actuated by manipulating the pick-up cone switch 58 to the "on" position to illuminate the pick-up cone lights 61 and determine the ph, temperature and oxygen content of the water at this specified depth by reading the corresponding ph display 55, temperature display 56 and oxygen display 57, respectively.

If the ph temperature and oxygen content of the water at this depth correspond to what the operator considers to be an optimum condition for fish, then the system is activated to pump water from the pick-up cone 29 through the water supply hose 19 and into either the rear live well 3 or the front live well 5, or optionally, to both the rear live well 3 and the front live well 5. Under circumstances where the water delivery system 1 utilizes the pick-up cone 29 illustrated in FIG. 5, the water is pumped by activating the submersible pump 38 by manipulating an appropriate switch (not illustrated) located in the steering console 9 of the boat 2, or otherwise located in the boat 2. Alternatively, under circumstances where the water delivery system 1 is characterized by a pick-up cone 29 which is designed according to FIG. 10 in cooperation with a booster pump 80 as illustrated in FIG. 9, the booster pump 80 is activated by a similar switch (not illustrated). When a sufficient amount of water is pumped into the rear live well 3 and/or the front live well 5, either the submersible pump 30a or the booster pump 80 is deactivated, as heretofore described, the pick-up cone switch 58 is switched to the "off" position and the front live well switch 59 is switched to the "on" position. This procedure illuminates the front live well light 62 and provides an indication of the ph, temperature and oxygen content of the water in the front live well 5 by reference to the numerals displayed on the ph display 55, temperature display 56 and the oxygen content display 57. The front live well switch 59 is then switched to the "off" position and the rear live well switch 60 is switched to the "on" position, to illuminate the rear live well lights 63 and provide a display of the ph, temperature and oxygen content on the ph display 55, temperature display 56 and oxygen content display 57, respectively. In this manner, a periodic review and monitoring of the ph, temperature and oxygen content of the water in the rear live well 3, front live well 5 and at the selected depth to which the pick-up cone 29 is deployed, is facilitated. As the ph, temperature and/or the oxygen content of the water in the front live well 5 and rear live well 3 begin to vary from the optimum conditions at the depth of the pick-up cone 29, additional water is pumped into the rear live well 3 and the front live well 5, in order to maintain near optimum conditions therein. If necessary, a quantity of the water existing in the rear live well 3 and the front live well 5 which has become oxygen depleted or is characterized by an undesirable ph or temperature change can be overflowed from the front live well 5 and the rear live well 3 and fresh water continuously substituted, as desired. This insures that fish and bait placed in the front live well 5 and rear live well 3 will always be immersed in fresh water which is retrieved from an optimum depth with a ph, temperature and oxygen content at optimum levels. Since this optimum stratum or depth will vary with the time of the day, additional adjustments may be made periodically in the depth of the pick-up cone 29, in order to maintain water which is pumped into the rear live well 3 and the front live well 5 at optimum or near optimum conditions.

It will be appreciated by those skilled in the art that the water delivery system of this invention can be utilized not only to supply water of near optimum condition to the live wells of a boat, but also to supply such water from selected depths in both fresh and salt water applications, to bait containers and holding tanks containing shrimp and other marine life which is used as bait for game fish. Furthermore, the system is applicable to docks located on the banks of lakes and other water bodies, as well as floating and permanently located platforms, such as oil rigs and other structures provided in both fresh and salt water environments. Additionally, while the graduations 19b serve to facilitate a simple means of determining the depth of the pick-up cone 29, a metering device can be attached to the reel 12 in order to accomplish this result, according to the knowledge of those skilled in the art.

While the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A water distribution system for mounting on a structure positioned over a water body and pumping water from a selected depth in the water body to a container for containing marine life, comprising a water pick-up cone; at least one first sensor provided in said water pick-up cone for analyzing at least one selected condition of the water at said selected depth and a monitor provided in electrical connection with said first sensor for indicating said selected condition of the water at said selected depth; a hose having one end secured to said water pick-up cone and the opposite end provided in fluid communication with the container; a reel mounted on the structure, said reel receiving the opposite end of said hose, wherein said reel is adapted to selectively wind and unwind said hose and deploy said water pick-up cone at said selected depth; and pump means provided in fluid delivery association with said hose for delivering water from said selected depth through said hose to the container.

2. The water distribution system of claim 1 wherein said pump means is a submersible pump carried by said pick-up cone.

3. The water distribution system of claim 1 wherein said pump means is a booster pump located in said structure.

4. The water distribution system of claim 1 wherein said at least one first sensor is a ph sensor.

5. The water distribution system of claim 1 wherein said at least one first sensor is a temperature sensor.

6. The water distribution system of claim 1 wherein said at least one first sensor is an oxygen content sensor.

7. The water distribution system of claim 1 wherein said at least one first sensor is a ph sensor, a temperature sensor and an oxygen content sensor.

8. A water distribution system for mounting on a structure positioned over a water body and pumping water from a selected depth in the water body to a container for containing marine life, comprising a water pick-up cone; at least one first sensor provided in said water pick-up cone for analying at least one selected condition of the water at said selected depth; at least one second sensor provided in said container for analyzing at least one selected condition of the water in said container and a monitor provided in electrical cooperation with said first sensor and said second sensor for indicating said selected condition of the water at said selected depth and in said container; a hose having one end secured to said water pick-up cone and the opposite end provided in fluid communication with the container; a reel mounted on the structure, said reel receiving the opposite end of said hose, wherein said reel is adapted to selectively wind and unwind said hose and deploy said water pick-up cone at said selected depth; and pump means provided in fluid delivery association with said hose for delivering water from said selected depth through said hose to said container.

9. The water distribution system of claim 8 wherein said at least one first sensor and at least one second sensor are each a PH sensor.

10. The water distribution system of claim 8 wherein said at least one first sensor and at least one second sensor, are each a temperature sensor.

11. The water distribution system of claim 8 wherein said at least one first sensor and at least one second sensor are each an oxygen content sensor.

12. The water distribution system of claim 8 wherein said at least one first sensor and at least one second sensor are each a PH sensor, a temperature sensor and an oxygen content sensor.

13. The water distribution system of claim 12 wherein said pump means is a submersible pump carried by said pick-up cone.

14. The water distribution system of claim 13 wherein said structure is a boat and said reel and said monitor are secured to said boat and said container is a live well.

15. The water distribution system of claim 12 wherein said pump means is a booster pump located in said structure.

16. The water distribution system of claim 15 wherein said structure is a boat and said reel and said monitor are secured to said boat and said container is a live well.

17. A method of delivering water from a selected depth in a water body to a container for containing and maintaining marine life in a live condition, comprising the steps of lowering a hose provided with a water pick-up cone to said selected depth; analyzing at least one first condition of the water at said selected depth; pumping the water from said selected depth through said pick-up cone and said hose to said container; analyzing at least one second condition of the water in said container; and comparing said second condition to said first condition in order to maintain said second condition substantially equal to said first condition.

18. The method according to claim 17 wherein said at least one first condition and said at least one second condition is the ph of the water.

19. The method according to claim 17 wherein said at least one first condition and said at least one second condition is the temperature of the water.

20. The method according to claim 17 wherein said at least one first condition and said at least one second condition is the oxygen content of the water.

21. The method according to claim 17 wherein said at least one first condition and said at least one second condition is the ph, temperature and oxygen content of the water.

22. A method of delivering water in a water body from a selected depth and stratum of water which is attractive to fish to at least one live well for containing fish and maintaining the fish in a live condition in a boat; comprising the steps of:
 (a) providing a reel having a length of hose wound thereon and a water pick-up cone secured to one end of said hose, with the opposite end of said hose provided in fluid communication with said live well;
 (b) lowering said water pick-up cone to said selected depth and stratum responsive to operation of said reel;
 (c) analyzing at least one first condition of the water at said selected depth;
 (d) pumping the water from said selected depth through said pick-up cone, said hose and said reel to said container;
 (e) analyzing at least one second condition of the water in said container; and
 (f) comparing said second condition to said first condition in order to maintain said second condition substantially equal to said first condition.

23. The method according to claim 22 wherein said at least one first condition and said at least one second condition is the ph of the water.

24. The method according to claim 22 wherein said at least one first condition and said at least one second condition is the temperature of the water.

25. The method according to claim 22 wherein said at least one first condition and said at least one second condition is the oxygen content of the water.

26. The method according to claim 22 wherein said at least one first condition and said at least one second condition is the ph, temperature and oxygen content of the water.

* * * * *